United States Patent Office 3,791,992
Patented Feb. 12, 1974

3,791,992
PREPARATION OF A MAGNESIUM SPINEL CATALYST BASE
Raymond Douglas Feldwick, Timonium, Md., assignor to W. R. Grace & Co., New York, N.Y.
No Drawing. Filed Oct. 6, 1972, Ser. No. 295,664
Int. Cl. B01j 11/06
U.S. Cl. 252—463                 9 Claims

ABSTRACT OF THE DISCLOSURE

The present invention is directed to a process for preparing a spinel-containing catalyst base characterized by shrinkage of less than about 3 percent after heating to temperatures in excess of 1500° F. comprising mixing a solution of a soluble acid salt of divalent magnesium with a solution of an alkali metal aluminate; separating and washing the resulting precipitate; exchanging the precipitate with an ammonium compound; followed by washing, drying, forming, and calcination. The catalyst base is especially useful for supporting auto exhaust conversion catalysts.

BACKGROUND OF THE INVENTION

The recent emphasis on the preparation of catalysts capable of converting the noxious components of automobile exhaust to innocuous entities has led to research in several related areas. The catalyst for conversion of automobile exhaust must have been several characteristics. It must, of course, be active for conversion of hydrocarbons and carbon monoxide over a long period of time under a wide variety of temperatures.

The temperature in an automobile muffler ranges from ambient temperature, which varies widely throughout the year, to temperatures in excess of 1500° F. The active components of the catalyst must be supported on a base which can withstand changes in temperatures from below zero, in some cases, to above 1500° F. over relatively short periods of time. In addition, this base must be resistant to shrinkage, crushing and attrition.

A catalyst base that shrinks in excess of 20 percent when exposed to temperatures of about 1500° F. is of limited usefulness as a base for an auto exhaust conversion catalyst. If 20 percent of the muffler is void space it is obvious that a substantial portion of the exhaust gases will by-pass the catalyst. In addition, this void space leads to problems of excessive attrition of the catalyst and a loss of a portion of the catalyst from the muffler.

Catalysts which are active for the conversion of the noxious components of automotive exhaust to innocuous entities have been prepared on a wide variety of bases. U.S. Pat. 3,295,918 to Briggs et al. describes a typical automotive exhaust conversion catalyst in which the active components of the catalyst are impregnated onto nodules of alpha alumina monohydrate and commercial gamma type alumina.

There are also several patents describing processes for preparing magnesia spinel (MgO·Al$_2$O$_3$). U.S. Pat. 3,304,153 to Bakker et al. describes a process in which a finely divided alumina-contributing component and a finely divided magnesia-contributing component are mixed in substantially stoichiometric proportions and the resulting admixture is calcined at a temperature of 850° C. to 1250° C. U.S. Pat. 3,530,209 describes the same process for preparing magnesium-aluminate spinel bodies, having very good radiation transmission characteristics, by forming a compact of finely divided spinel powder and sintering under high pressure and high temperature.

BRIEF DESCRIPTION OF THE INVENTION

It has now been found that a catalyst base containing spinel and characterized by shrinkage of less than about 3 percent after heating at temperatures above 1500° F. for about twenty-four hours can be prepared by the process of the present invention. The process includes mixing a solution of a soluble acid salt of divalent magnesium with a solution of an alkali metal aluminate; separating and washing the resulting precipitate; exchanging the washed precipitate with a solution of an ammonium compound to decrease the alkali metal content; followed by washing, drying, forming and calcination steps.

DETAILED DESCRIPTION OF THE INVENTION

Initially, the soluble acid salt solution and the alkali metal aluminate solutions are prepared. The acid salt may be almost any water-soluble acid salt containing divalent magnesium. The anion of the acid salt may be, for example, nitrate, sulfate, chloride and the like. Preferably, the anion is nitrate. Catalyst bases having excellent properties have been prepared by the present process using solutions of magnesium nitrate. The magnesium acid salt solution may be prepared by mixing the salt with an aqueous medium, e.g., water, in appropriate amounts such that the resulting solution contains from about 0.379 to about 2.84 percent by weight of magnesium.

The alkali metal aluminate solution may be prepared in any suitable manner. The solution may be prepared, for example, by mixing the desired soluble alkali metal aluminate with an aqueous medium, e.g., water, or by mixing an alkali metal hydroxide with water, heating the resulting alkali metal hydroxide solution to a temperature of from about 190° F. to about 220° F., and mixing a suitable alumina component with the heated hydroxide solution. The alkali metal moiety may be sodium or potassium. Suitable alumina components include, for example, alpha alumina trihydrate and alpha alumina monohydrate. The alkali metal aluminate solution is prepared using appropriate amounts of ingredients such that about 18.14 percent by weight of aluminate (Al$_2$O$_4$) is included, base on the weight of the solution.

Prior to mixing the magnesium salt solution with the alkali metal aluminate solution, the magnesium salt solution is heated to a temperature of from about 140° F. to about 200° F. and the aluminate solution is heated to or maintained at a temperature of from about 190° F. to about 220° F. Either or both of the solutions may be prepared at temperatures within their respective temperature ranges.

It is critical that the solutions be heated to temperatures in the ranges set out above. A catalyst base or support should have a high surface area and be a relatively porous material in order that maximum activity will be exhibited by catalyst systems having catalytic components deposited on the base. It is found that mixing of the magnesium salt and aluminate solutions while at temperatures not in their respective critical ranges results in preparation of products having inadequate pore volume or surface area for satisfactory use as catalyst bases.

After the magnesium acid salt and aluminate solutions have been heated, they are admixed while at temperatures in their respective temperature ranges set forth above. The solutions are mixed in proper proportions such that from about 0.180 to about 0.603 mole or equivalent divalent magnesium is added per one mole or equivalent of aluminate (Al$_2$O$_4$). The mixing may be effected in almost any manner. More intimate mixing generally aids subsequent separation of the resulting precipitate from the mixed solutions. Good mixing has been effected using a variety of well-known mixing means, including static mixers, two-fluid mixing nozzles, etc. Conveniently, the aluminate solution may be added to the magnesium acid salt solution while stirring.

The mixed solutions system typically is a slurry and is maintained at a temperature of from about 140° F. to about 200° F., and perferably from about 160° F. to about 180° F., for an aging or reaction period of from about 0.25 to about 5 hours. Aging is found to facilitate separation of the precipitate from the mixed solutions, while generally and desirably aiding in increasing the crystallinity of the final base product. Typically, the aging period is about one hour and the system temperature is maintained at from about 160° F. to about 180° F. Mixing is preferably continued throughout the aging period.

After mixing and aging the mixed solutions, the resulting precipitate is separated from the mixed solutions, typically as a concentrate. The separation may be effected in almost any manner. Numerous techniques for separation of precipitates from liquids are well known in the art. Well-known separation techniques which are useful herein include, for example, decantation, filtration, and centrifuging. Filtration is generally preferred for improved efficiency and increased economy. Any effective filtration means may be used.

After the separation step, the precipitate concentrate is washed with a solvent for the alkali metal oxide, e.g., water, to decrease the alkali metal content of the precipitate. Washing may be effected in any suitable manner. Good results have been obtained by mixing one part by weight, dry basis, of the precipitate concentrate with from about 15 to about 20 parts by weight of water at a temperature from about 1600 F. to about 190° F. with stirring for about 15 to about 30 minutes, followed by separating the washed precipitate. This separation may be carried out by filtration.

After washing, the precipitate is exchanged with an aqueous solution of ammonium hydroxide or an ammonium salt. The exchanging step is repeated as may be necessary until the alkali metal oxide content of the exchanged precipitate is decreased to less than 0.15 percent by weight, dry basis, of the precipitate. The ammonium salts which may be used depend on the end use of the catalyst base being prepared. In general, suitable salts include ammonium nitrate, ammonium chloride, ammonium sulfate, and the like. Typically, trace amounts of the anion of the ammonium salt are introduced into the catalyst base. Since sulfate and chloride may poison catalyst systems in exhaust gas conversion use for internal combustion engines, the ammonium compound is preferably ammonium nitrate if an internal combustion engine conversion catalyst system is to be prepared from the base.

Eminently suitable catalyst bases may be prepared using an exchange step wherein the precipitate is mixed with 10 weight percent aqueous ammonium nitrate solution using from about 0.10 to about 0.40 part by weight, dry basis, of precipitate per one part by weight of ammonium nitrate. After mixing for a period of time to decrease the alkali metal oxide content of the precipitate to a desired level, the precipitate is separated from the exchange solution.

Preferably, the ammonium nitrate solution is maintained at a temperature from about 150° F. to about 190° F., and typically about 160° F., mixing being continued, or the exchange step being repeated until the final alkali metal oxide content is decreased to less than 0.15 percent by weight, dry basis. Too long a period of exchanging may result in loss of magnesium from the catalyst base being prepared. The exchange should be completed as rapidly as possible and should not exceed 16 hours.

The exchange conditions such as time, temperature, concentration of ammonia, relative amounts of precipitate, the ammonium compound, etc. may be varied, provided that the alkali metal oxide content is decreased to less than 0.15 percent by weight, dry basis.

If desired, the exchanged precipitate may be washed to further decrease the alkali metal oxide content. Washing may be effected as above described for the pre-exchange wash steps.

After exchanging, and washing if desired, the precipitate is dried, preferably at a temperature of from about 250° F. to about 400° F. for a period of from about 6 to about 18 hours.

The dried precipitate is next formed into a desired physical shape. The precipitate may be formed into a variety of useful forms, including powder, granules, pills, extrudates, and like particulate froms, all of which, for simplicity, are referred to herein as nodules. If the dried precipitate is in cake or other agglomerate form, as may result from filtration, the agglomerates typically must be finely divided as by grinding prior to forming.

After the nodules are formed, the formed precipitate is dried in any suitabel manner. Drying is normally effected in a period from about 1 to about 4 hours at a temperature in the range of about 250° F. to about 400° F.

After the nodules are dried, calcination is effected. It is critical that the nodules be calcined at temperatures in the range of about 1675° F. to about 2000° F. for about 0.5 to about 5 hours, preferably for about 2 to about 4 hours. Calcination using temperatures and/or times outside the critical ranges generally results in products having inadequate balance of shrink-resistance, spinel content, porosity, and surface area for satisfactory use as catalyst bases.

Optionally, the exchanged precipitate is extracted with acetone after the alkali metal oxide content is decreased to less than 0.15 percent by weight dry basis and before drying the precipitate. Acetone extraction has been found to increase the surface area and pore volume of the final base product. Especially good results have been observed using three acetone extractions wherein about 10 parts by weight of acetone are added per one part by weight, dry basis, of the precipitate.

A very desirable set of characteristics for a catalyst base for use in high temperature catalysts is high surface area, high porosity, relatively low density, low shrinkage and high crushing strength. Materials having a low density, high surface area and high porosity obviously have a high capacity for absorption of the liquids containing the catalytic components, e.g., metal salts. In addition, this low density decreases the net weight of the catalyst assembly.

The crushing strength data for the catalyst base in the examples which follow was determined using ASTM procedure D695–69.

The determination was made by selecting at least five (5) typical specimens. The test was conducting by using a standard testing machine capable of control of constant rate-of-crosshead movements. The device was equipped with a drive mechanism, a supporting jig and a compressive tool for applying the load to the test specimens. The tool is so constructed that loading is axial within 1:1000 and applied to surfaces that are flat within 0.025 millimeter and parallel to each other in a plane normal to the vertical loading axis.

The nodules are placed on the supporting jig and the dead weight load (in pounds) that 5 nodules will withstand is measured. The results are reported as the average crushing strength.

The present invention is further illustrated by the following non-limiting examples, wherein the various solutions were prepared from commercially available chemicals.

EXAMPLE 1

75 pounds of magnesium nitrate hexahydrate was added with stirring to 675 pounds of water contained in a 200 gallon stainless steel kettle. Stirring was continued for about 30 minutes and the resulting magnesium nitrate solution was heated to 190° F. The solution contained 0.9481 percent of divalent magnesium (calculated).

A total of 41.8 pounds of sodium hydroxide pellets was added with stirring to 104 pounds of water contained in a 25 gallon kettle. Stirring was continued for about 20 minutes and the resulting aqueous sodium hydroxide was heated to a temperature of 190° F. to 220° F. The alumina, 46 pounds of alpha alumina trihydrate, was added slowly and stirring was continued for about 90 minutes. The resulting sodium aluminate solution contained 18.14 percent by weight of aluminate ($Al_2O_4$) (calculated).

The sodium aluminate solution was added to the magnesium nitrate solution and intimate mixing of the addition was effected by stirring to cavitation. The temperature was maintained at 160° F. to 180° F. with stirring for one hour.

The resulting reaction mixture was filtered on a commercially available rotary vacuum filter, and a substantial amount of precipitate concentrate was collected on the filter cloth in the form of a cake containing 16.0 weight percent sodium oxide (11.8 weight percent Na). The precipitate was washed by adding the precipitate concentrate to about 750 pounds of water at a temperature of 160° F. with stirring for about 30 minutes followed by filtering as above, the precipitate again being collected in the form of a cake which now contained 6.9 percent sodium oxide (5.12 percent sodium). The precipitate was next exchanged with ammonium ions by dispersing the precipitate cake in 10 weight percent aqueous ammonium nitrate at a temperature of 160° F. and using a 1:1 weight ratio of cake (dry basis) to ammonium nitrate ($NH_4NO_3$). Dispersion was effected by adding the precipitate cake to the ammonium nitrate solution with stirring for about 30 minutes, after which time the dispersion was filtered as described above. The precipitate cake now contained 1.84 weight percent sodium oxide (1.36 weight percent sodium). The foregoing exchanging and filtering procedure was repeated twice. The precipitate cake was found to contain 0.86 weight percent sodium oxide (0.64 weight percent sodium) and 0.29 weight percent sodium oxide (0.22 weight percent soidum) after the second and third exchanges, respectively. Next, the water wash was repeated and the collected precipitate cake now contained 0.12 weight percent sodium oxide (0.09 weight percent sodium).

The precipitate cake was dried in air at a temperature of 300° F. for 16 hours and the dried precipitate was ground through a 30 mesh Tyler standard screen. The ground precipitate was formed into 3/16-inch pills using well-known pill-forming techniques. The pills were dried in air at a temperature of 250° F. for 4 hours and thereafter calcined at a temperature of 1700° F. for 3 hours.

The calcination product was found to contain a high magnesium aluminate spinel content and have a surface area of 84 square meters per gram.

EXAMPLE 2

The magnesium aluminate spinel containing product of Example 1 was heat treated at a temperature of 1800° F. for 24 hours. Tests showed that the product shrank 1.85 percent during this treatment. The test shows that the product is eminently suitable as a minimally shrinkable support for high temperature catalyst systems, including auto exhaust conversion systems.

EXAMPLES 3 TO 8

The procedure of Example 1 was repeated except that the calcination temperature was 800° F., 1000° F., 1200° F., 1400° F., 1600° F. and 1800° F. The magnesium aluminate spinel containing products prepared using the various calcination temperatures were heat treated at a temperature of 1800° F. for 24 hours. The percent shrinkage after this heat treating is shown in the data of Table I below. Data from other physical property tests is also shown in Table I.

TABLE I.—APPROXIMATE PHYSICAL PROPERTIES

| Example number | Calcination temperature (° F.) | Shrinkage (percent) | Surface area [a] | Pore volume [b] | Density [c] | ACS [d] |
|---|---|---|---|---|---|---|
| 1 | 1,700 | 0.99 | 84 | 0.21 | 0.775 | 15.96 |
| 3 | 800 | 13.71 | 130 | 0.30 | | 10.70 |
| 4 | 1,000 | 16.81 | 135 | 0.42 | 0.756 | 11.60 |
| 5 | 1,200 | 15.07 | 124 | 0.35 | 0.730 | 12.16 |
| 6 | 1,400 | 9.51 | 125 | 0.38 | 0.717 | 16.04 |
| 7 | 1,600 | 7.11 | 96 | 0.36 | 0.770 | 9.35 |
| 8 | 1,800 | 0.54 | 75 | 0.29 | 0.800 | 16.50 |

[a] Square meters per gram.
[b] Cubic centimeters per gram.
[c] Grams per cubic centimeter.
[d] Average crush strength, pounds.

The data in Table I shows that the spinel containing products prepared according to the embodiments of the present process set forth by way of illustration in Examples 1 and 8 are eminently suitable support components for high temperature catalyst assemblies.

EXAMPLES 9 TO 11

The procedures of Examples 4, 6, and 8 were repeated except that after washing the ammonium exchanged precipitate and prior to drying the washed precipitate, the precipitate products were extracted. Extraction was effected by adding the washed precipitate to acetone at a temperature of 70° F. with stirring for about 30 minutes and filtering using the filtration procedure generally as given in Example 1. Three such acetone extractions were carried out. Surface properties of the final products were even better for these acetone extracted products, as shown in Table II which follows:

TABLE II

Without acetone extraction

| Example number | Surface area (square m./gram) | Pore volume (cc./gram) |
|---|---|---|
| 4 | 135 | 0.42 |
| 6 | 125 | 0.38 |
| 8 | 75 | 0.29 |

With acetone extraction

| Example number | Surface area (square m./gram) | Pore volume (cc./gram) |
|---|---|---|
| 9 | 243 | 0.43 |
| 10 | 188 | 0.46 |
| 11 | 104 | 0.26 |

EXAMPLE 12

An active catalyst assembly for reducing nitrogen oxides in automobile exhaust gases was prepared by impregnating the catalyst base of Example 1 to incipient wetness with a solution of cobalt nitrate and nickel nitrate. A sufficient amount of the solution was used to provide 5.2 weight percent nickel oxide and 4.86 weight percent cobalt oxide in the final catalyst. After impregnation, the assembly was dried in air at a temperature of 250° F. and thereafter sprayed with an aqueous solution containing 25 percent of the water required to reach incipient wetness and sufficient palladium nitrate to provide 0.04 weight percent palladium in the final catalyst. The sprayed assembly was calcined at 1400° F. for 3 hours.

The catalyst had a pore volume of 0.24 cubic centimeter (cc.) per gram, a pore diameter of 177 angstroms, and a density of 1.03 grams per cc. The surface area was 54 square meters per gram and the average crushing strength was 21 pounds.

After heat treating the catalyst at 1800° F. for 24 hours, the density was 1.10 grams per cc. and the average crush strength was 16 pounds. The percent shrinkage effected by this heat treatment was 1.85 percent.

It is to be understood that the foregoing detailed description is given merely by way of illustration and that various modifications may be made therein without departing from the spirit or scope of the present invention.

What is claimed is:

1. A process for preparing a spinel-containing catalyst base characterized by shrinkage of less than 3 percent after exposure to temperatures above 1500° F. for periods of about 24 hours which comprises
    (a) preparing an aqueous solution of a soluble magnesium acid salt, said solution containing from about 0.379 to about 2.84 percent by weight of magnesium based on the weight of the solution;
    (b) heating the acid salt solution to a temperature of from about 140° F. to about 200° F.
    (c) preparing an aqueous solution of an alkali metal aluminate wherein the alkali metal is selected from the group consisting of sodium and potassium, said aluminate solution containing about 18.14 percent by weight of aluminate based on the weight of the solution;
    (d) heating the aluminate solution to a temperature of from about 190° F. to about 220° F.;
    (e) mixing the heated acid salt solution with the heated aluminate solution in proportions such that from about 0.180 to about 0.603 mole of magnesium is added per one mole of aluminate and maintaining the mixed solutions at a temperature of from about 140° F. to about 200° F. for a period of from about 0.25 to about 5 hours to form a precipitate;
    (f) separating a concentrate of the precipitate from the mixed solutions;
    (g) washing the precipitate concentrate;
    (h) exchanging the washed precipitate with an aqueous solution of ammonium hydroxide or an ammonium salt to decrease the alkali metal oxide content of the precipitate to less than 0.15 percent by weight dry basis;
    (i) drying the exchanged precipitate;
    (j) forming the dried precipitate to a desired physical shape;
    (k) drying the formed precipitate at a temperature of from about 250° F. to about 400° F. for from about 1 to about 4 hours;
    (l) calcining the dried formed precipitate at a temperature of from about 1675° F. to about 2000° F., for a period of from about 0.5 to about 5 hours; and
    (m) recovering the spinel-containing catalyst base product.

2. The process of claim 1 wherein the precipitate concentrate is separated by filtering.

3. The process of claim 1 wherein the alkali metal aluminate is sodium aluminate.

4. The process of claim 1 wherein the mixed solutions are maintained at a temperature of from about 160° F. to about 180° F.

5. The process of claim 1 wherein the mixed solutions are maintained at a temperature of from about 160° F. to about 180° F. for about 1 hour.

6. The process of claim 1 wherein said ammonium salt is selected from the group consisting of ammonium nitrate, ammonium sulfate and ammonium chloride.

7. The process of claim 1 wherein said ammonium salt is ammonium nitrate.

8. The process of claim 1 further including extracting the exchanged precipitate with acetone prior to said forming step.

9. The process of claim 1 wherein said calcination is for a period of from about 2 to about 4 hours.

References Cited

UNITED STATES PATENTS

| | | | |
|---|---|---|---|
| 2,071,119 | 2/1937 | Harger | 423—213 |
| 2,474,215 | 6/1949 | Kearby | 423—600 X |
| 3,368,982 | 2/1968 | Milbourne | 252—466 J |
| 3,600,429 | 8/1971 | Kronig et al. | 252—466 J |
| 3,702,882 | 11/1972 | Rettew et al. | 423—600 |

DANIEL E. WYMAN, Primary Examiner

W. J. SHINE, Assistant Examiner

U.S. Cl. X.R.

423—213, 600